April 21, 1970  W. L. KING  3,507,366
VARIABLE SHOCK ABSORBER AND VALVE MEANS THEREFOR
Filed June 5, 1967
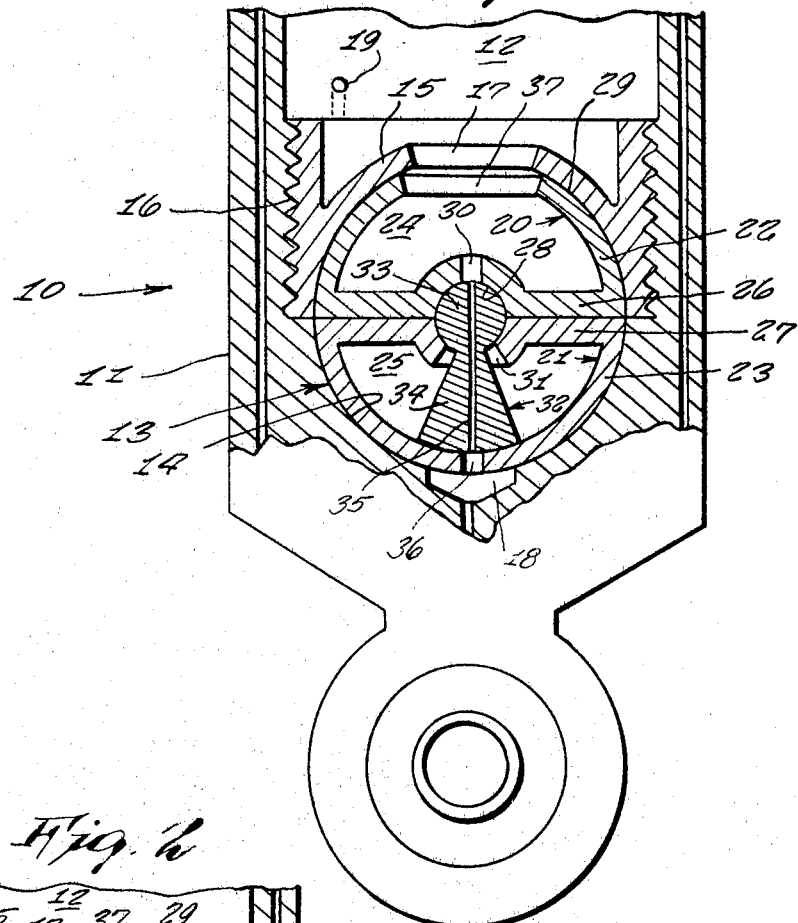
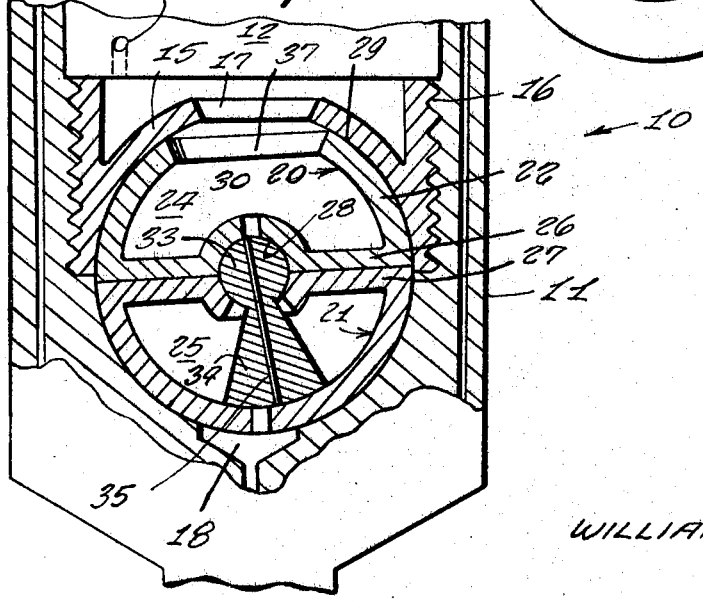
INVENTOR
WILLIAM L. KING

United States Patent Office 3,507,366
Patented Apr. 21, 1970

3,507,366
VARIABLE SHOCK ABSORBER AND VALVE
MEANS THEREFOR
William L. King, Beale AFB, Calif. (3rd Air Div. (SAC)
CMR, Box 2032, APO, San Francisco, Calif. 96334)
Filed June 5, 1967, Ser. No. 643,437
Int. Cl. F16f 9/34
U.S. Cl. 188—100                                   1 Claim

ABSTRACT OF THE DISCLOSURE

A shock absorber for automobiles, which includes a pendant valve suspended within a globular valve, the pendant valve being more sensitive to inertial forces due to its center of gravity being located further from a center of rotation, thus causing upon abrupt stop or turn, to cut off fluid to a soft ride position of the shock absorber, whereas the globular valve would compensate for gradual changes in attitude of the vehicle, such as going up and down hills and for mounting slightly out of vertical position.

This invention relates generally to shock absorbers for automotive vehicles.

A principal object of the present invention is to provide a shock absorber which is variable in response to the riding condition of the vehicle.

Another object is to provide a variable shock absorber which will give a soft ride during normal operating conditions, and a much firmer ride when it is needed during hard cornering or sudden starting or stopping.

Another object is to provide a variable shock absorber that would promote safety and better handling. There would be less tendency for a car to nosedive in case of a panic stop, or to lean over excessively during sharp turns, thus making it easier to maintain control during emergencies. Thus the device would provide the soft cushioned ride that most people demand today while at the same time maintaining the emergency handling characteristics of a more stiff suspension.

Other objects are to provide a variable shock absorber for automotive vehicles which is simple in design, inexpensive to manufacture, rugged in construction, easy to use and efficient in operation.

These and other objects will be readily evident upon a study of the following specification and the accompanying drawing wherein:

FIGURE 1 is a cross section of a shock absorber incorporating the present invention and shown in one position, and FIGURE 2 is a similar view thereof shown in an alternate position.

Referring now to the drawing in detail, the reference numeral 10 represents a variable shock absorber according to the present invention wherein there is a shock absorber housing 11 which, together with a piston is secured between a wheel assembly and automobile chassis frame. The housing includes a cylinder 12 within which a head of a piston is slidable (not shown) to absorb riding shock.

At one end of the housing there is a global valve 13 of spherical configuration that is carried within a semispherical seat 14 formed in the housing and a semispherical cap 15 rigidly secured to the housing by thread 16. The end cap is provided with opening 17 therethrough to allow communication for hydraulic fluid between the global valve and the cylinder 12. The housing is provided with an opening 18 adjacent the diametrically opposite side of the globular valve, the opening 18 allowing fluid communication between the global valve and the other end of the hydraulic fluid system (not shown).

A bypass opening 19 in the cylinder likewise communicates with the other end of the fluid system, the bypass opening being always open and for the purpose of providing a stiff ride.

The globular valve is comprised of two semispherical parts 20 and 21 each of which is comprised of a shell 22 and 23 respectively having central cavities 24 and 25 respectively. Each shell includes a circular wall 26 and 27 respectively that abut each other, the walls together forming at their center a spherical seat 28 that is concentric with the outer surface 29 of the globular valve. Openings 30 and 31 respectively are provided upon opposite sides of the seat each of which is in a semispherical portion of walls 26 and 27.

A pendant valve 32 has a spherical head 33 carried within seat 28 the head having a depending body 34 extending downward through opening 21 into the cavity 25. The lower surface of the body 34 may be in sliding contact with the inner surface of shell 23. The body 34 is enlarged at its lower portion so to respond to momentum changes. A narrow central opening 35 extends through the pendant valve 32 to communicate with openings 30 and opening 36 through the lower end of the globular valve. An opening 37 diametrically opposite on the globular valve thus completes the series of openings that permit fluid communication between the cylinder 12 and the opening 18 in the lower end of the housing.

In operative use, the bypass opening 19 is always open for a stiff ride. Likewise communication from cylinder 12 through the globular valve 13 and pendant valve 32 to the opening 18 is open when riding condition is normal. In case of a sudden start or stop, or a hard cornering, the pendant valve will swing, causing communication therethrough to shut off fluid flow through the soft ride fluid path, forcing all the fluid to flow through a path which is adjusted to give a very firm or stiff ride.

The globular valve also pivots in its seat 14 but is less sensitive.

While various changes may be made in the detail construction, it is understood that such changes will be within the spirit and scope of the present invention.

Having thus set forth and disclosed the nature of this invention, what is claimed is:

1. In a variable shock absorber, the combination of a cylinder with a piston head slidable therewithin from one end thereof, a bypass opening between said cylinder and another end of a fluid system to provide a stiff ride, and means at the other end of said cylinder for automatically varying between said stiff ride and a soft ride for an automoive vehicle, said means comprising a globular valve and a pendant valve therewithin said globular valve responding to gradual attitude changes of said vehicle, and said pendant valve responding to sudden attitude changes, said valves being in a communication line between said cylinder and said other end of said fluid system, said globular valve is pivotal within a semispherical seat of said housing and a semispherical seat of a cap secured to said housing, said globular valve comprising a pair of hollow hemisphere shells adjacent to each other and said hemisphere shells forming a concentric seat therewithin to support said pendant valve, said pendant valve comprises a spherical head carried in said concentric seat and having a dependent body extending there-from, said cap, said globular valve shells, said concentric seat and said pendant valve having openings therethrough which in alignment form communication in said communication line.

References Cited

UNITED STATES PATENTS

| | | | |
|---|---|---|---|
| 297,343 | 4/1884 | Bell et al. | 137—45 |
| 1,908,762 | 5/1933 | Johnston et al. | 137—45 |
| 2,144,583 | 1/1939 | Focht. | |

FOREIGN PATENTS 699,231  11/1940  Germany.

GEORGE E. A. HALVOSA, Primary Examiner

U.S. Cl. X.R.

137—45, 48